United States Patent
Miura et al.

(10) Patent No.: US 9,537,414 B2
(45) Date of Patent: Jan. 3, 2017

(54) POWER CONVERSION APPARATUS THAT SWITCHES ELECTRODE CONNECTION WHEN A SHORT-CIRCUIT IS DETECTED

(71) Applicant: Toyota Jidosha Kabushiki Kaisha, Toyota-shi Aichi-ken (JP)

(72) Inventors: Mitsuhiro Miura, Toyota (JP); Kazuyuki Sasaki, Nagoya (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 14/948,778

(22) Filed: Nov. 23, 2015

(65) Prior Publication Data

US 2016/0156274 A1 Jun. 2, 2016

(30) Foreign Application Priority Data

Nov. 27, 2014 (JP) ................. 2014-240443

(51) Int. Cl.
*H02M 3/335* (2006.01)
*H02M 3/158* (2006.01)
*H02M 1/00* (2006.01)
*H02M 1/32* (2007.01)

(52) U.S. Cl.
CPC ....... *H02M 3/33584* (2013.01); *H02M 3/1582* (2013.01); *H02M 3/33561* (2013.01); *H02M 2001/009* (2013.01); *H02M 2001/325* (2013.01)

(58) Field of Classification Search
CPC .................................................. H02M 3/335
See application file for complete search history.

(56) References Cited

U.S. PATENT DOCUMENTS

| 7,518,889 | B2 * | 4/2009 | Baurle | H02M 3/33507 363/21.12 |
| 8,829,713 | B2 * | 9/2014 | Ishigaki | B60R 25/00 307/66 |
| 9,419,532 | B2 * | 8/2016 | Hirano | H02M 3/33576 |
| 2009/0189582 | A1 * | 7/2009 | Watanabe | H02M 1/32 323/282 |
| 2011/0198933 | A1 | 8/2011 | Ishigaki et al. | |

FOREIGN PATENT DOCUMENTS

JP   2011-193713 A   9/2011

* cited by examiner

*Primary Examiner* — Emily P Pham
(74) *Attorney, Agent, or Firm* — Dinsmore & Shohl LLP (57) ABSTRACT

A full-bridge circuit has serial first arms and serial second arms. Another full-bridge circuit has serial third arms and serial fourth arms. Primary and secondary coils of a transformer are included, respectively, in a part connecting a middle point of the first arms and a middle point of the second arms and a part connecting a middle point of the third arms and a middle point of the fourth arms. A switching phase difference between the first arms and the third arms and a switching phase difference between the second arms and the fourth arms are adjusted, and transmission power between these full-bridge circuits is controlled. Connections of respective electrodes of a power source are inversely connected to respective polarity buses of the other full-bridge circuit. A phase of switching in one of the third and fourth arms other one having a short-circuit failure is inverted.

16 Claims, 6 Drawing Sheets

POWER CONVERSION APPARATUS THAT SWITCHES ELECTRODE CONNECTION WHEN A SHORT-CIRCUIT IS DETECTED

CROSS-REFERENCE TO RELATED APPLICATIONS

The present application claims priority to Japanese Patent Application No. 2014-240443, filed on Nov. 27, 2014, the entire contents of which are incorporated herein by reference.

BACKGROUND

1. Technical Field

The present disclosure relates to a power conversion apparatus.

2. Description of the Related Art

A power conversion apparatus is known including a transformer having a primary coil and a secondary coil; a primary-side full-bridge circuit having a first arm circuit and a second arm circuit; and a secondary-side full-bridge circuit having a third arm circuit and a fourth arm circuit (see Japanese Laid-Open Patent Application No. 2011-193713).

In the first arm circuit, a first upper arm and a first lower arm are connected in series; in the second arm circuit, a second upper arm and a second lower arm are connected in series; in the third arm circuit, a third upper arm and a third lower arm are connected in series; and in the fourth arm circuit, a fourth upper arm and a fourth lower arm are connected in series.

In the primary-side full-bridge circuit, the primary coil of the transformer is included in a bridge part connecting a middle point between the first upper arm and the first lower arm and a middle point between the second upper arm and the second lower arm. In the secondary-side full-bridge circuit, the secondary coil of the transformer is included in a bridge part connecting a middle point between the third upper arm and the third lower arm and a middle point between the fourth upper arm and the fourth lower arm.

The power conversion apparatus further includes a control part adjusting the first phase difference between switching in the first arm circuit and switching in the third arm circuit and the second phase difference between switching in the second arm circuit and switching in the fourth arm circuit, and controlling the transmission power transmitted between the primary-side full-bridge circuit and the secondary-side full-bridge circuit.

SUMMARY

According to one aspect of the present disclosure, a power conversion apparatus includes a transformer having a primary coil and a secondary coil; a primary-side full-bridge circuit having a first arm circuit including a first upper arm and a first lower arm connected in series, and a second arm circuit including a second upper arm and a second lower arm connected in series, wherein the primary coil is included in a first bridge part that connects a first middle point between the first upper arm and the first lower arm and a second middle point between the second upper arm and the second lower arm; a secondary-side full-bridge circuit having a third arm circuit including a third upper arm and a third lower arm connected in series, and a fourth arm circuit including a fourth upper arm and a fourth lower arm connected in series, wherein the secondary coil is included in a second bridge part that connects a third middle point between the third upper arm and the third lower arm and a fourth middle point between the fourth upper arm and the fourth lower arm; and a control part that adjusts a first phase difference between switching in the first arm circuit and switching in the third arm circuit and a second phase difference between switching in the second arm circuit and switching in the fourth arm circuit, and controls transmission power transmitted between the primary-side full-bridge circuit and the secondary-side full-bridge circuit. When a short-circuit failure is detected in one of the third upper arm and the fourth upper arm, the control part switches a connection of a positive electrode of a power source to a negative-polarity bus of the secondary-side full-bridge circuit, switches a connection of a negative electrode of the power source to a positive-polarity bus of the secondary-side full-bridge circuit, and inverts a phase of switching in one of the third arm circuit and the fourth arm circuit other than the one having the short-circuit failure.

According to another aspect of the present disclosure, a power conversion apparatus includes a plurality of converters. Each converter includes a transformer having a primary coil and a secondary coil; a primary-side full-bridge circuit having a first arm circuit including a first upper arm and a first lower arm connected in series, and a second arm circuit including a second upper arm and a second lower arm connected in series, wherein the primary coil is included in a first bridge part that connects a first middle point between the first upper arm and the first lower arm and a second middle point between the second upper arm and the second lower arm; a secondary-side full-bridge circuit having a third arm circuit including a third upper arm and a third lower arm connected in series, and a fourth arm circuit including a fourth upper arm and a fourth lower arm connected in series, wherein the secondary coil is included in a second bridge part that connects a third middle point between the third upper arm and the third lower arm and a fourth middle point between the fourth upper arm and the fourth lower arm; and a control part that adjusts a first phase difference between switching in the first arm circuit and switching in the third arm circuit and a second phase difference between switching in the second arm circuit and switching in the fourth arm circuit, and controls transmission power transmitted between the primary-side full-bridge circuit and the secondary-side full-bridge circuit. When a short-circuit failure is detected in one of the third upper arm and the fourth upper arm, the control part switches a connection of a positive electrode of a power source to a negative-polarity bus of the secondary-side full-bridge circuit, switches a connection of a negative electrode of the power source to a positive-polarity bus of the secondary-side full-bridge circuit, and inverts a phase of switching in one of the third arm circuit and the fourth arm circuit other than the one having the short-circuit failure. Respective positive-polarity buses of the primary-side full-bridge circuits in the plurality of converters are connected together. Respective negative-polarity buses of the primary-side full-bridge circuits in the plurality of converters are connected together. The respective positive-polarity buses of the secondary-side full-bridge circuits in the plurality of converters are connected together. The respective negative-polarity buses of the secondary-side full-bridge circuits in the plurality of converters are connected together.

Other objects, features and advantages of the present disclosure will become more apparent from the following detailed description when read in conjunction with the accompanying drawings.

DETAILED DESCRIPTION OF THE EMBODIMENTS

In a conventional power conversion apparatus, when the third upper arm has a short-circuit failure, it may not be possible to apply a voltage to the secondary coil of the transformer when the fourth upper arm is turned on. Therefore, it may be difficult to continue the power transmission between the primary-side full-bridge circuit and the secondary-side full-bridge circuit. The same situation occurs also when the fourth upper arm has a short-circuit failure.

Therefore, some embodiments described herein provide a power conversion apparatus with which it is possible to continue power transmission between a primary-side full-bridge circuit and a secondary-side full-bridge circuit even when one of a third upper arm and a fourth upper arm has a short-circuit failure.

Embodiments of the present disclosure will now be described with reference to the accompanying drawings.

Figure 1:
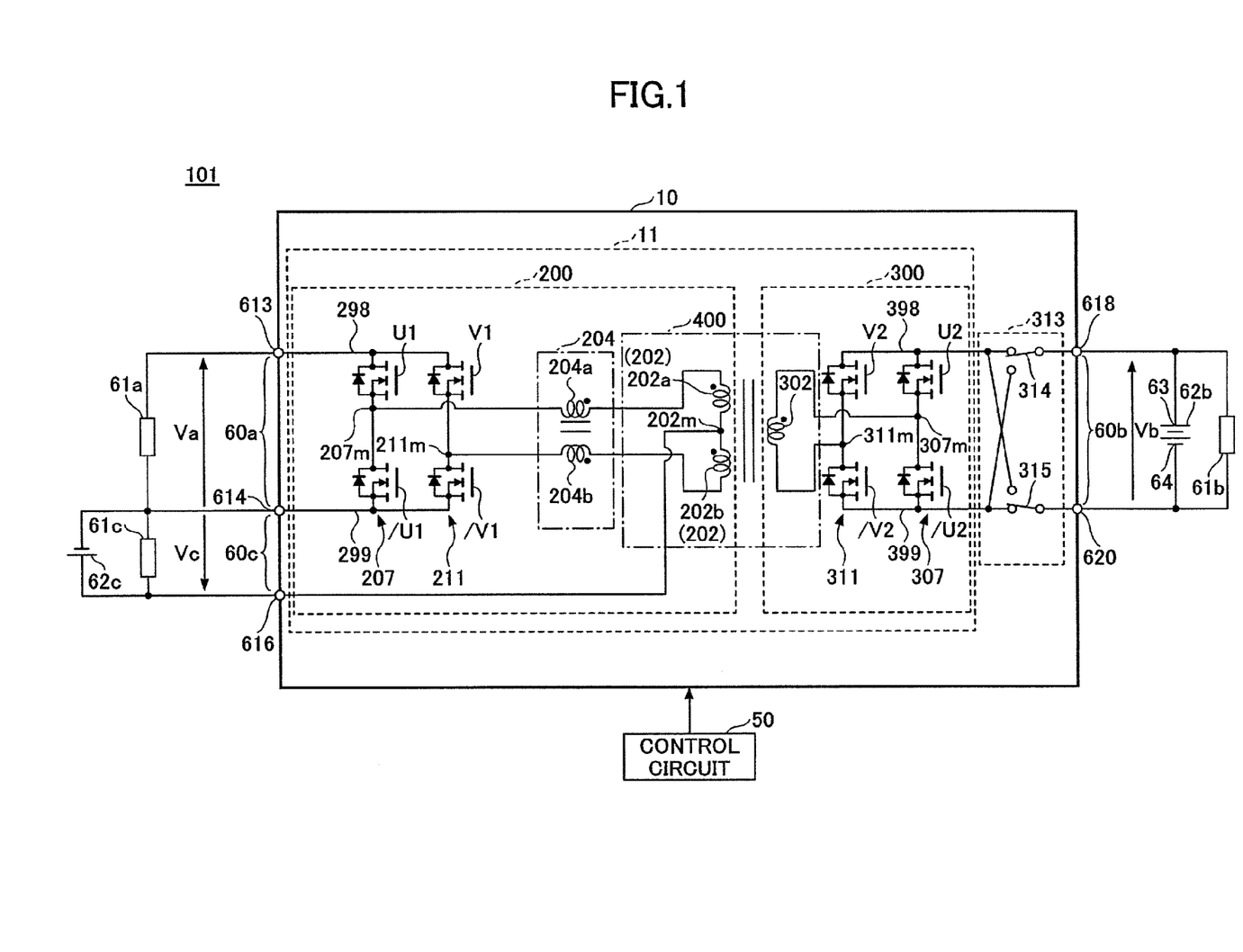
FIG. 1 illustrates one example of a power conversion apparatus.

FIG. 1 illustrates one example of a configuration of a power supply unit 101 in one embodiment of a power conversion apparatus. The power supply unit 101 is mounted, for example, in a vehicle such as an automobile, and is one example of a vehicular power supply system distributing power to respective loads mounted in the vehicle. The power supply unit 101 includes, for example, a power supply circuit 10 and a control circuit 50.

The power supply circuit 10 includes three or more ports, and is one example of a power conversion circuit having a function of carrying out power conversion between two ports selected from the three or more ports. The power supply circuit 10 according to the embodiment has, for example, a first port 60a, a second port 60c, a third port 60b and a converter 11.

The first port 60a is one example of a first terminal part of the power supply circuit 10, and, for example, a load 61a is connected thereto.

The load 61a is one example of one or more high-voltage loads. As examples of the high-voltage (for example, 48 V) load 61a, an electric power steering apparatus assisting steering operation can be cited.

The second port 60c is one example of a second terminal part of the power supply circuit 10, and, for example, a battery 62c and a load 61c are connected thereto.

The battery 62c is one example of a low-voltage power source capable of supplying DC power to the load 61c that works with the same voltage system as the battery 62c. The low-voltage (for example, 12 V lower than 48 V) battery 62c may be called an "auxiliary battery". As a specific example of the battery 62c, a secondary battery such as a lead-acid battery can be cited. It is possible to charge the battery 62c by, for example, a charging device such as an alternator (not shown).

The load 61c is one example of one or more low-voltage loads. The load 61c may be called an "auxiliary load". As a specific example of the load 61c, an electronic control unit (ECU) controlling a certain apparatus/device can be cited.

The third port 60b is one example of a third terminal part of the power supply circuit 10, and, for example, a battery 62b and a load 61b are connected thereto.

The battery 62b is one example of a high-voltage power source capable of supplying DC power to the load 61b that works with the same voltage system as the battery 62b. The high-voltage (for example, 288 V higher than 48 V) battery 62b may be called a "main battery" (or, a "propulsion battery" or a "traction battery"). As a specific example of the battery 62b, a secondary battery such as a lithium-ion battery can be cited. It is possible to charge the battery 62b by, for example, regenerated power supplied by the load 61b.

The load 61b is one example of one or more high-voltage loads. As a specific example of the load 61b, an inverter converting DC power into AC power can be cited.

Port Voltages Va, Vb and Vc are input or output voltages at the first port 60a, the third port 60b and the second port 60c, respectively.

The converter 11 is one example of a DC-DC converter that converts the voltage of DC power that is input to one of the ports and outputs the voltage-converted DC power from another of the ports. The converter 11 according to the present embodiment includes, for example, a transformer 400, a primary-side full-bridge circuit 200 and a secondary-side full-bridge circuit 300. The primary-side full-bridge circuit 200 and the secondary-side full-bridge circuit 300 are magnetically coupled by the transformer 400. Primary-side ports including the first port 60a and the second port 60c and a secondary-side port including the third port 60b are connected via the transformer 400.

The transformer 400 has a primary coil 202 and a secondary coil 302. As a result of the primary coil 202 and the secondary coil 302 being magnetically coupled with a coupling coefficient $k_T$, the transformer 400 functions as a transformer having a turn ratio 1:N between the primary coil 202 and the secondary coil 302. "N" is a positive number greater than 1. The transformer 400 is, for example, a transformer of a center-tap type having a center tap 202m.

The primary coil 202 includes a primary first winding 202a, a primary second winding 202b and the center tap 202m drawn from a middle connection point between the primary first winding 202a and the primary second winding 202b. The number of turns of the primary first winding 202a is the same as the number of turns of the primary second winding 202b. The center tap 202m is connected to a terminal 616 of the second port 60c at the high-potential side.

The primary-side full-bridge circuit 200 is connected on the primary side of the transformer 400. The primary-side full-bridge circuit 200 is one example of a primary-side power conversion part including the primary coil 202 of the transformer 400, primary-side magnetic coupling reactors 204, a first upper arm U1, a first lower arm /U1, a second upper arm V1 and a second lower arm /V1.

The first upper arm U1, the first lower arm /U1, the second upper arm V1 and the second lower arm /V1 are, for example, switching devices including N-channel MOSFETs and body diodes (parasitic diodes) thereof, respectively. It is also possible to additionally connect a diode to each arm in parallel.

The primary-side full-bridge circuit 200 includes a primary-side positive-polarity bus 298 connected to a terminal 613 of the first port 60a at the high-potential side, and a primary-side negative-polarity bus 299 connected to a terminal 614 of the first port 60a and the second port 60c at the low-potential side.

Between the primary-side positive-polarity bus 298 and the primary-side negative-polarity bus 299, a first arm circuit 207 having the first upper arm U1 and the first lower arm /U1 connected in series is connected. The first arm circuit 207 is one example of a primary-side first power conversion circuit part (primary-side U-phase power conversion circuit part) capable of carrying out power conversion operation through turning-on/off switching operations of the first upper arm U1 and the first lower arm /U1.

Between the primary-side positive-polarity bus 298 and the primary-side negative-polarity bus 299, also a second arm circuit 211 having the second upper arm V1 and the second lower arm /V1 connected in series is connected. The second arm circuit 211 is connected with the first arm circuit 207 in parallel. The second arm circuit 211 is one example of a primary-side second power conversion circuit part (primary-side V-phase power conversion circuit part) capable of carrying out power conversion operation through turning-on/off switching operations of the second upper arm V1 and the second lower arm /V1.

In a bridge part connecting a middle point 207m of the first arm circuit 207 and a middle point 211m of the second arm circuit 211, the primary coil 202 and the primary-side magnetic coupling reactors 204 are included. Explaining the bridge part in more detail concerning the connection relationship, one end of a primary-side first reactor 204a of the primary-side magnetic coupling reactors 204 is connected to the middle point 207m of the first arm circuit 207. One end of the primary coil 202 is connected to the other end of the primary-side first reactor 204a. One end of a primary-side second reactor 204b of the primary-side magnetic coupling reactors 204 is connected to the other end of the primary coil 202. The other end of the primary-side second reactor 204b is connected to the middle point 211m of the second arm circuit 211.

The primary-side magnetic coupling reactors 204 include the primary-side first reactor 204a, and the primary-side second reactor 204b magnetically coupled to the primary-side first reactor 204a with a coupling coefficient $k_1$.

The middle point 207m is a primary-side first middle node between the first upper arm U1 and the first lower arm /U1. The middle point 211m is a primary-side second middle node between the second upper arm V1 and the second lower arm /V1. The middle point 207m is connected to the middle point 211m via the primary-side first reactor 204a, the primary coil 202 and the primary-side second reactor 204b in the stated order.

The first port 60a is connected to the primary-side full-bridge circuit 200, and is an input/output port connected between the primary-side positive-polarity bus 298 and the primary-side negative-polarity bus 299. The first port 60a includes the terminal 613 and the terminal 614.

The second port 60c is connected to the primary-side center tap 202m of the transformer 400, and is an input/output port connected between the primary-side negative-polarity bus 299 and the center tap 202m of the primary coil 202. The second port 60c includes the terminal 614 and the terminal 616.

The secondary-side full-bridge circuit 300 is connected on the secondary side of the transformer 400. The secondary-side full-bridge circuit 300 is one example of a secondary-side power conversion part including the secondary coil 302 of the transformer 400, a third upper arm U2, a third lower arm /U2, a fourth upper arm V2 and a fourth lower arm /V2.

The third upper arm U2, the third lower arm /U2, the fourth upper arm V2 and the fourth lower arm /V2 are, for example, switching devices including N-channel MOSFETs and body diodes (parasitic diodes) thereof, respectively. It is also possible to additionally connect a diode to each arm in parallel.

The secondary-side full-bridge circuit 300 includes a secondary-side positive-polarity bus 398 connected to a terminal 618 of the third port 60b at the high-potential side and a secondary-side negative-polarity bus 399 connected to a terminal 620 of the third port 60b at the low-penitential side.

Between the secondary-side positive-polarity bus 398 and the secondary-side negative-polarity bus 399, a third arm circuit 307 having the third upper arm U2 and the third lower arm /U2 connected in series is connected. The third arm circuit 307 is one example of a secondary-side first power conversion circuit part (secondary-side U-phase power conversion circuit part) capable of carrying out power conversion operation through turning-on/off switching operations of the third upper arm U2 and the third lower arm /U2.

Between the secondary-side positive-polarity bus 398 and the secondary-side negative-polarity bus 399, also a fourth arm circuit 311 having the fourth upper arm V2 and the fourth lower arm /V2 connected in series is connected. The fourth arm circuit 311 is connected to the third arm circuit 307 in parallel. The fourth arm circuit 311 is one example of a secondary-side second power conversion circuit part (secondary-side V-phase power conversion circuit part) capable of carrying out power conversion operation through turning-on/off switching operations of the fourth upper arm V2 and the fourth lower arm /V2.

In a bridge part connecting a middle point 307m of the third arm circuit 307 and a middle point 311m of the fourth arm circuit 311, the secondary coil 302 is included. Explaining the bridge part in more detail concerning the connection relationship, one end of the secondary coil 302 is connected to the middle point 307m of the third arm circuit 307. The other end of the secondary coil 302 is connected to the middle point 311m of the fourth arm circuit 311.

The middle point 307m is a secondary-side first middle node between the third upper arm U2 and the third lower arm /U2. The middle point 311m is a secondary-side second middle node between the fourth upper arm V2 and the fourth lower arm /V2. The middle point 307m is connected to the middle point 311m via the secondary coil 302.

The third port 60b is an input/output port connected to the secondary-side full-bridge circuit 300 and connected between the secondary-side positive-polarity bus 398 and the secondary-side negative-polarity bus 399. The third port 60b includes the terminal 618 and the terminal 620.

The control circuit 50 is one example of a control part that controls the voltage conversion operation of the converter 11, and outputs control signals to the converter 11 to cause the converter 11 to carry out the voltage conversion operation. The control circuit 50 according to the present embodiment outputs the control signals for turning on/off the respective arms of the primary-side full-bridge circuit 200 and the secondary-side full-bridge circuit 300. The control circuit 50 is, for example, a microcomputer including a Central Processing Unit (CPU) or an electronic circuit including the microcomputer.

Figure 2:
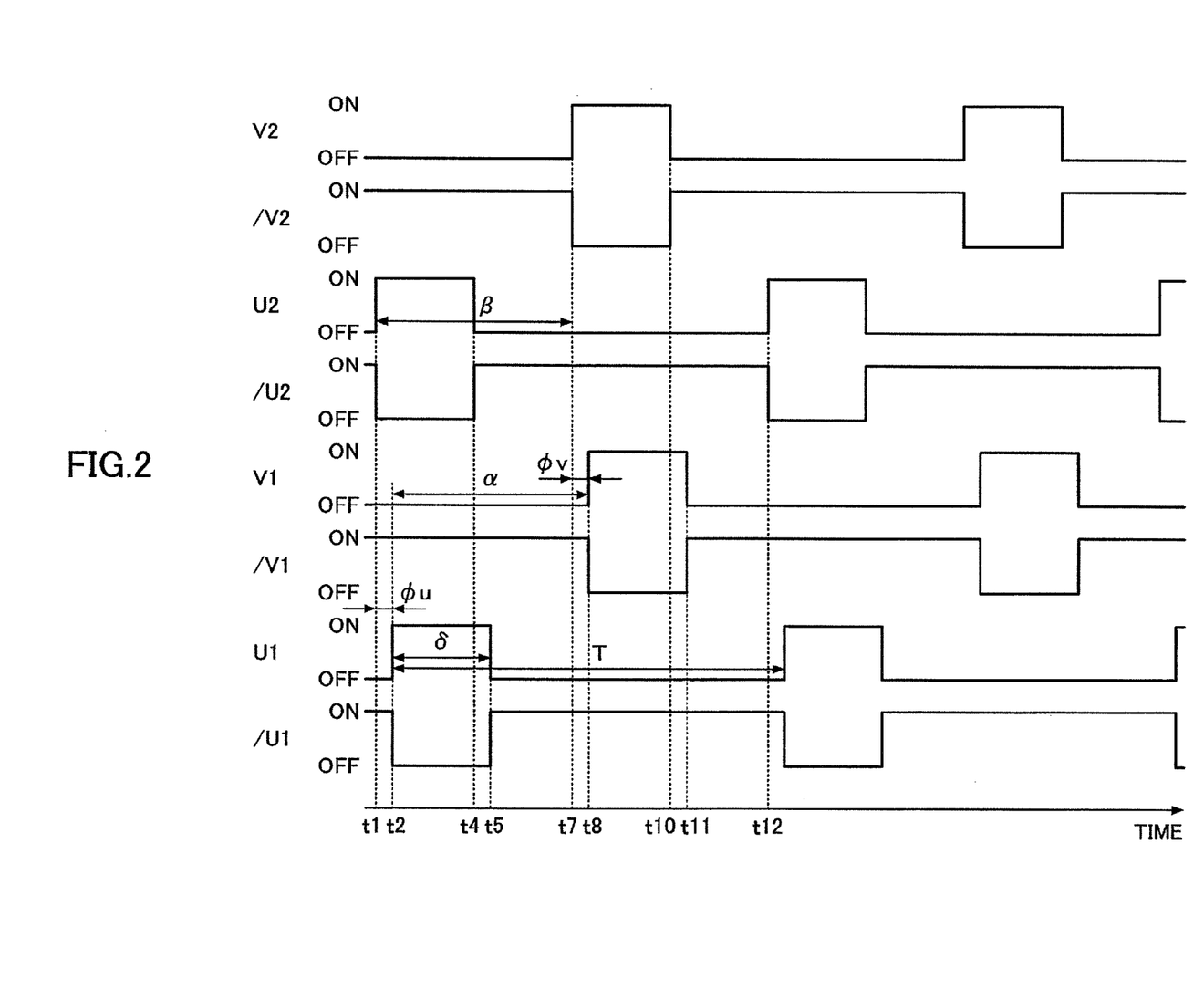
FIG. 2 is a timing chart illustrating one example of operations of the power conversion apparatus.

FIG. 2 illustrates one example of a timing chart of turning on/off each arm. In FIG. 2, U1 shows a turning-on/off waveform of the first upper arm U1; V1 shows a turning-on/off waveform of the second upper arm V1; U2 shows a turning-on/off waveform of the third upper arm U2; and V2 shows a turning-on/off waveform of the fourth upper arm V2. The turning-on/off waveforms of the first lower arm /U1, the second lower arm /V1, the third lower arm /U2 and the fourth lower arm /V2 are those inverted from the turning-on/off waveforms of the first upper arm U1, the second upper arm V1, the third upper arm U2 and the fourth upper arm V2, respectively.

Note that, between both turning-on/off waveforms of the upper and lower arms, a dead time can be provided for the purpose of preventing a through current from flowing due to turning on both upper and lower arms. Note that in the total 8 turning-on/off waveforms shown in FIG. 2, the high level represents a turned-on state while the low level represents a turned-off state.

The control circuit 50 turns on/off each arm by repeating a switching pattern including 4 periods of time. The first period t2-t4 is a period of time where the upper arms U1 and U2 and the lower arms /V1 and /V2 are turned on, and the upper arm V1 and V2 and the lower arms/U1 and /U2 are turned off. The second period t5-t7 is a period of time where the lower arms/U1 and /U2 and the lower arms/V1 and /V2 are turned on, and the upper arm U1 and U2 and the upper arm V1 and V2 are turned off. The third period t8-t10 is a period of time where the lower arms/U1 and /U2 and the upper arm V1 and V2 are turned on, and the upper arm U1 and U2 and the lower arms/V1 and /V2 are turned off. The fourth period t11-t12 is a period of time where the lower arms/U1 and /U2 and the lower arms/V1 and /V2 are turned on, and the upper arm U1 and U2 and the upper arm V1 and V2 are turned off.

The control circuit 50 is capable of changing the voltage-raising (boosting or stepping-up) ratio or the voltage-lowering (stepping-down) ratio of the primary-side full-bridge circuit 200 by controlling, for example, the duty ratio D (=δ/T).

The duty ratio D is a ratio of the turning-on period of time δ to the switching cycle T of the first upper arm U1 and the second upper arm V1 in the primary-side full-bridge circuit 200. The duty ratio D of the first upper arm U1 is equal to the duty ratio D of the second upper arm V1. The voltage-raising/lowering ratio of the primary-side full-bridge circuit 200 is equal to the voltage transformation ratio between the first port 60a and the second port 60c.

Therefore, for example, the following equation holds.

voltage-raising/lowering ratio of primary-side full-bridge circuit 200=(voltage of second port 60c)/(voltage of first port 60a)=δ/T Note that the turning-on period of time δ indicates the turning-on period of time of the first upper arm U1 and the second upper arm V1, and also, indicates the turning-on period of time of the third upper arm U2 and the fourth upper arm V2. Also, the switching cycles T of the arms included in the primary-side full-bridge circuit 200 are equal to the switching cycles T of the arms included in the secondary-side full-bridge circuit 300.

In the normal state, the control circuit 50 controls the operations with the phase difference α between U1 and V1 as, for example, 180 degrees (π), and controls the operations with the phase difference β between U2 and V2 as 180 degrees (π). The phase difference α between U1 and V1 is the time difference between the timing t2 and the timing t8. The phase difference β between U2 and V2 is the time difference between the timing t1 and the timing t7.

The control circuit 50 can adjust the transmission power P transmitted through the transformer 400 between the primary-side full-bridge circuit 200 and the secondary-side full-bridge circuit 300 by controlling the phase differences φ (the phase difference φu and the phase difference φv).

The phase differences φ are the shifts in timing (time lags) between the power conversion circuit parts having the same phases between the primary-side full-bridge circuit 200 and the secondary-side full-bridge circuit 300.

The phase difference φu is the shift in switching timing between the corresponding phases between the first arm circuit 207 and the third arm circuit 307, and is the time difference between the switching in the first arm circuit 207 and the switching in the third arm circuit 307. For example, the phase difference φu is the difference between the turning-on timing t2 of the first upper arm U1 and the turning-on timing t1 of the third upper arm U2. The switching in the first arm circuit 207 and the switching in the third arm circuit 307 are controlled by the control circuit 50 mutually in the same phase (i.e., U phase).

The phase difference φv is the shift in switching timing between the corresponding phases between the second arm circuit 211 and the fourth arm circuit 311, and is the time difference between the switching in the second arm circuit 211 and the switching in the fourth arm circuit 311. For example, the phase difference φv is the difference between the turning-on timing t8 of the second upper arm V1 and the turning-on timing t7 of the fourth upper arm V2. The switching in the second arm circuit 211 and the switching in the fourth arm circuit 311 are controlled by the control circuit 50 mutually in the same phase (i.e., V phase).

The control circuit 50 can transmit the transmission power P from the primary-side full-bridge circuit 200 to the secondary-side full-bridge circuit 300 by controlling the phase difference φu to be positive and controlling the phase difference φv to be positive. The control circuit 50 can transmit the transmission power P from the secondary-side full-bridge circuit 300 to the primary-side full-bridge circuit 200 by controlling the phase difference φu to be negative and controlling the phase difference φv to be negative. In other words, between the power conversion circuit parts having the same phases in the primary-side full-bridge circuit 200 and the secondary-side full-bridge circuit 300, the transmission power P is transmitted from the full-bridge circuits having the power conversion circuit parts in which the upper arms are turned on earlier to the full-bridge circuits having the power conversion circuit parts in which the upper arms are turned on later.

For example, in the case of FIG. 2, the turning-on timing t1 of the third upper arm U2 is earlier than the turning-on timing t2 of the first upper arm U1. Therefore, the transmission power P is transmitted from the secondary-side full-bridge circuit 300 including the third arm circuit 307 having the third upper arm U2 to the primary-side full-bridge circuit 200 including the first arm circuit 207 having the first upper arm U1. In the same way, the turning-on timing t7 of the fourth upper arm V2 is earlier than the turning-on timing t8 of the second upper arm V1. Therefore, the transmission power P is transmitted from the secondary-side full-bridge circuit 300 including the fourth arm circuit 311 having the fourth upper arm V2 to the primary-side full-bridge circuit 200 including the second arm circuit 211 having the second upper arm V1.

Normally, the control circuit 50 carries out the control while keeping the phase difference φu to be the same as the phase difference φv. However, it is also possible to carry out the control while shifting the phase difference φu from the phase difference φv in such a range as to satisfy the accuracy required for the transmission power P. In other words, normally, the phase difference φu and the phase difference φv are controlled to have the same value. However, it is also possible that, as long as the accuracy required for the transmission power P is satisfied, the phase difference φu and the phase difference φv can be controlled to have mutually different values.

The control circuit 50 is capable of controlling the duty ratio D in such a manner that, for example, the port voltage Vc will be consistent with the target voltage Vco that is set for the second port 60c, by feeding back the port voltage Vc detected by a detection circuit. Also, in another timing, the control circuit 50 is capable of controlling the duty ratio D in such a manner that, for example, the port voltage Va will be consistent with the target voltage Vao that is set for the first port 60a, by feeding back the port voltage Va detected by a detection circuit.

Further, the control circuit 50 is capable of controlling the phase differences φ in such a manner that, for example, the transmission power P will be consistent with a target transmission power Po by feeding back the transmission power P detected by a detection circuit. The control circuit 50 carries out power feeding back control of controlling the phase differences φ in such a manner that, for example, the transmission power $P_{A+C}$ transmitted from the third port 60b to the first port 60a and the second port 60c will be consistent with a target transmission power $P_{A+C*}$ by feeding back the transmission power $P_{A+C}$ detected by a detecting circuit. Also, in another timing, The control circuit 50 carries out power feeding back control of controlling the phase differences φ in such a manner that, for example, the transmission power $P_B$ transmitted from the first port 60a to the third port 60b becomes a target transmission power $P_{B*}$ by feeding back the transmission power $P_B$ detected by a detecting circuit the detection circuit.

The transmission power $P_{A+C}$ is the power transmitted from the secondary-side full-bridge circuit 300 to the primary-side full-bridge circuit 200 through the transformer 400, and is equal to the sum of the transmission power $P_A$ transmitted to the first port 60a and the transmission power $P_C$ transmitted to the second port 60c. The transmission power $P_A$ is equal to the product of the port voltage Va that is output from the first port 60a and the port current Ia that is output from the first port 60a. The transmission power $P_C$ is equal to the product of the port voltage Vc that is output from the second port 60c and the port current Ic that is output from the second port 60c. The transmission power $P_B$ is equal to the product of the port voltage Vb that is output from the third port 60b and the port current Ib that is output from the third port 60b.

Thus, the power supply circuit 10 carries out power conversion between the respective ports by controlling at least one of the duty ratio D and phase differences φ by detecting the port voltages Va, Vb and Vc and the port currents Ia, Ib and Ic at the respective ports by the detection circuits.

In FIG. 1, the control circuit 50 determines whether a short-circuit failure occurs in one of the third upper arm U2 and the fourth upper arm V2 according to any fault detection method.

In some embodiments, the control circuit 50 determines that the third upper arm U2 is a failed arm having a short-circuit failure if, for example, it is determined the voltage across the third upper arm U2 is equal to approximately zero in a period of time where the third upper arm U2 is to be in a turned-off state. The voltage across the third upper arm U2 is an electric potential difference between the secondary-side positive-polarity bus 398 and the middle point 307m. In the same way, in some embodiments, the control circuit 50 determines that the fourth upper arm V2 is a failed arm having a short-circuit failure if, for example, it is determined the voltage across the fourth upper arm V2 is equal to approximately zero in a period of time where the fourth upper arm V2 is to be in a turned-off state. The voltage across the fourth upper arm V2 is an electric potential difference between the secondary-side positive-polarity bus 398 and the middle point 311m.

In some embodiments, the control circuit 50 determines that the third upper arm U2 is a failed arm having a short-circuit failure if, for example, it is determined the voltage at the middle point 307m is equal to the voltage at the secondary-side positive-polarity bus 398 in a period of time where the third upper arm U2 is to be in a turned-off state. In the same way, in some embodiments, the control circuit 50 determines that the fourth upper arm V2 is a failed arm having a short-circuit failure if, for example, it is determined the voltage at the middle point 311m is equal to the voltage at the secondary-side positive-polarity bus 398 in a period of time where the fourth upper arm V2 is to be in a turned-off state.

In some embodiments, if it is determined that no voltage is applied to the secondary coil 302 in a period of time where one of the third upper arm U2 and the fourth upper arm V2 is to be in a turned-on state, the control circuit 50 determines that the other upper arm that is not to be in a turned-on state is a failed arm having a short-circuit failure. This is because, if one upper arm is turned on while the other upper arm has a short-circuit failure, a loop circuit is created through the third upper arm U2, the secondary coil 302 and the fourth upper arm V2 in the stated order.

In some embodiments, if the ambient temperature of the third upper arm U2 is higher than a predetermined temperature threshold, the control circuit 50 determines that the third upper arm U2 is a failed arm having a short-circuit failure. If the ambient temperature of the fourth upper arm V2 is higher than a predetermined temperature threshold, the control circuit 50 determines that the fourth upper arm V2 is a failed arm having a short-circuit failure. This is because a short-circuit failure causes abnormal heat generation.

It is also possible that the control circuit 50 determines whether the third upper arm U2 has a short-circuit failure based on, for example, the gate current Ig of the third upper arm U2, and determines whether the fourth upper arm V2 has a short-circuit failure based on the gate current Ig of the fourth upper arm V2.

If a short-circuit failure is detected in one of the third upper arm U2 and the fourth upper arm V2, the control circuit 50 switches the connection of the positive electrode 63 of the battery 62b to the secondary-side negative-polarity bus 399, and switches the connection of the negative electrode 64 of the battery 62b to the secondary-side positive-polarity bus 398. By thus switching the connections, it is possible to invert the polarities (i.e., plus and minus) of the power supply voltage of the battery 62b supplied to the secondary-side positive-polarity bus 398 and the secondary-side negative-polarity bus 399 of the secondary-side full-bridge circuit 300.

The power supply circuit 10 according to the present embodiment has, for example, a switching circuit 313. The control circuit 50 according to the present embodiment switches the connection of the positive electrode 63 to the secondary-side negative-polarity bus 399 and switches the connection of the negative electrode 64 to the secondary-side positive-polarity bus 398 through the switching operations of the switching circuit 313.

The switching circuit 313 has, for example, a first switch 314 and a second switch 315. The first switch 314 is capable of selectively switching the connection of the positive electrode 63 between the secondary-side positive-polarity bus 398 and the secondary-side negative-polarity bus 399, and thus, is capable of switching the connection of the positive electrode 63 from the secondary-side positive-polarity bus 398 to the secondary-side negative-polarity bus 399. In the same way, the second switch 315 is capable of selectively switching the connection of the negative electrode 64 between the secondary-side positive-polarity bus 398 and the secondary-side negative-polarity bus 399, and thus, is capable of switching the connection of the negative electrode 64 from the secondary-side negative-polarity bus 399 to the secondary-side positive-polarity bus 398.

The first switch 314 is, for example, inserted between the secondary-side full-bridge circuit 300 and the terminal 618 in series in the secondary-side positive-polarity bus 398. The second switch 315 is, for example, inserted between the secondary-side full-bridge circuit 300 and the terminal 620 in series in the secondary-side negative-polarity bus 399. As specific examples of the first switch 314 and the second switch 315, transistors, relays, or the like can be cited.

In some embodiments, when detecting a failed arm having a short-circuit failure as one of the third upper arm U2 and the fourth upper arm V2, the control circuit 50 inverts the phase of switching in the arm circuit other than the failed arm circuit including the failed arm among the third arm circuit 307 and the fourth arm circuit 311 in addition to switching the connections of the positive electrode 63 and the negative electrode 64 as described above.

In some embodiments that determine that the third upper arm U2 has a short-circuit failure, the control circuit 50 switches the connections of the positive electrode 63 and the negative electrode 64 as described above, and also, inverts the phase of switching in the fourth arm circuit 311 connected parallel to the third arm circuit 307 including the third upper arm U2. Thereby, it is possible to replace the roles of the fourth upper arm V2 and the fourth lower arm /V2 included in the fourth arm circuit 311. In other words, the fourth upper arm V2 comes to play the role of the lower arm and the fourth lower arm /V2 comes to play the role of the upper arm. Therefore, even when the third upper arm U2 has a short-circuit failure, it is possible to apply the port voltage Vb of the battery 62b to the secondary coil 302 when the fourth lower arm /V2 that plays the role of the upper arm is turned on. Thus, it is possible to continue the power transmission between the primary-side full-bridge circuit 200 and the secondary-side full-bridge circuit 300.

On the other hand, in some embodiments that determine that the fourth upper arm V2 has a short-circuit failure, the control circuit 50 switches the connections of the positive electrode 63 and the negative electrode 64 as described above, and also, inverts the phase of switching in the third arm circuit 307 connected parallel to the fourth arm circuit 311 including the fourth upper arm V2. Thereby, it is possible to replace the roles the third upper arm U2 and the third lower arm /U2 included in the third arm circuit 307. In other words, the third upper arm U2 comes to play the role of the lower arm and the third lower arm /U2 comes to play the role of the upper arm. Therefore, even when the fourth upper arm V2 has a short-circuit failure, it is possible to apply the port voltage Vb of the battery 62b to the secondary coil 302 when the third lower arm /U2 that plays the role of the upper arm is turned on. Thus, it is possible to continue the power transmission between the primary-side full-bridge circuit 200 and the secondary-side full-bridge circuit 300.

Figure 3:
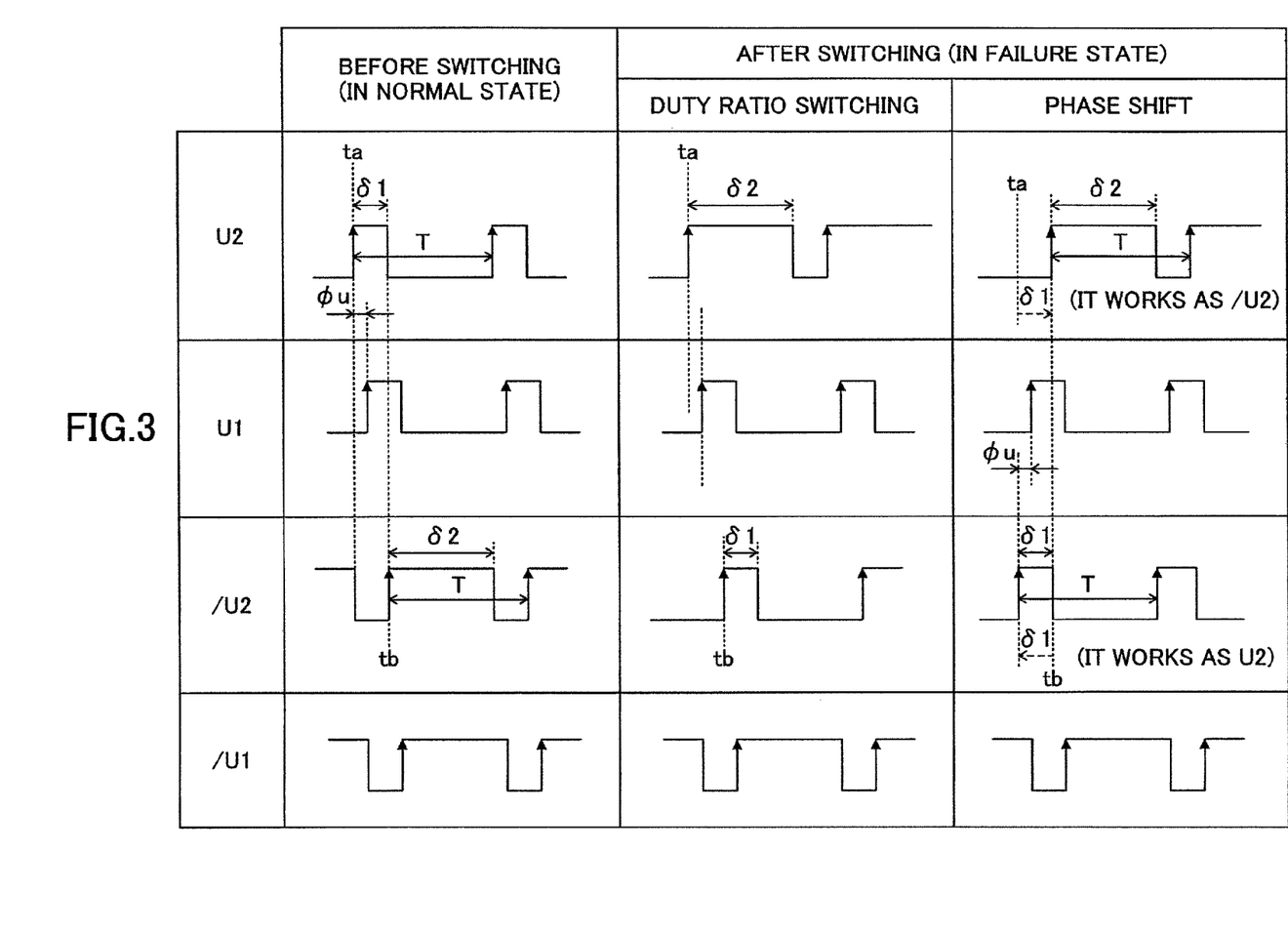
FIG. 3 illustrates one example of operations of inverting the phase of switching.

Next, operations will be described for inverting the phase of switching in the third arm circuit 307 in an example when a short-circuit failure of the fourth upper arm V2 is detected.

FIG. 3 illustrates one example of switching waveforms in the third arm circuit 307 and the first arm circuit 207 when a short-circuit failure of the fourth upper arm V2 is detected. In the same way as FIG. 2, FIG. 3 shows one example of turning-on/off waveforms of the third upper arm U2 and the third lower arm /U2 included in the third arm circuit 307, and one example of turning-on/off waveforms of the first upper arm U1 and the first lower arm /U1 included in the first arm circuit 207.

In the normal state before the short-circuit failure of the fourth upper arm V2 is detected, the control circuit 50 controls the third upper arm U2 at the duty ratio D1 (=δ1/T), and controls the third lower arm /U2 at the duty ratio D2 (=δ2/T). The turning-on period of time δ1 of the third upper arm U2 is a period of time elapsing from the turning-on timing ta of the third upper arm U2 to the turning-off timing of the third upper arm U2 before the short-circuit failure of the fourth upper arm V2 is detected. The turning-on period of time δ2 of the third lower arm /U2 is a period of time elapsing from the turning-on timing tb of the third lower arm /U2 to the turning-off timing of the third lower arm /U2 before the short-circuit failure of the fourth upper arm V2 is detected.

The turning-on period of time δ2 is longer than the turning-on period of time δ1. Also, the phase difference φu before the short-circuit failure of the fourth upper arm V2 is detected is the time difference between the turning-on timing of the first upper arm U1 and the turning-on timing of the third upper arm U2.

When it is detected that the fourth upper arm V2 has the short-circuit failure, the control circuit 50 first replaces the duty ratios of the upper and lower arms U2 and /U2 in the third arm circuit 307. The control circuit 50 changes the turning-on period of time of the third upper arm U2 starting from the timing ta to be longer, from δ1 to δ2. Thus, the control circuit 50 changes the duty ratio of the third upper arm U2 to be greater, from D1 to D2. On the other hand, the control circuit 50 changes the turning-on period of the third lower arm /U2 starting from the timing tb to be shorter, from δ2 to δ1. Thus, the control circuit 50 changes the duty ratio of the third lower arm /U2 to be smaller, from D2 to D1.

Next, the control circuit 50 delays the timing of turning on the third upper arm U2 from the timing ta by δ1, and controls the third upper arm U2 at the duty ratio D2. On the other hand, the control circuit 50 advances the timing of turning on third lower arm /U2 from the timing tb by δ1, and controls the third lower arm /U2 at the duty ratio D1. Note that the control circuit 50 need not carry out replacing the duty ratios between the upper and lower arms of the first arm circuit 207 and need not carry out phase shifts of the turning-on timing in the first arm circuit 207 when it is detected that the fourth upper arm V2 has the short-circuit failure.

Thus, the control circuit 50 can change the time difference between the timing of turning on the first lower arm U1 and the timing of turning on the third lower arm /U2 into the phase difference φu by replacing the duty ratios and carrying out the phase shifts of the turning-on timing for the upper and lower arms U2 and /U2 of the third arm circuit 307. In other words, after the short-circuit failure of the fourth upper arm V2 is detected, the control circuit 50 can operate the third lower arm /U2 regarding it as the third upper arm U2 while operating the third upper arm U2 regarding it as the third lower arm /U2.

Therefore, the control circuit 50 can continue the power transmission between the primary-side full-bridge circuit 200 and the secondary-side full-bridge circuit 300 even after the short-circuit failure of the fourth upper arm V2 is detected. In the case of FIG. 3, before and after it is detected that the fourth upper arm V2 has the short-circuit failure, the control circuit 50 can transmit the transmission power P according to the phase difference φu from the secondary-side full-bridge circuit 300 to the primary-side full-bridge circuit 200.

In FIG. 1, for example, in some embodiments when a short-circuit failure of the third upper arm U2 is detected, the control circuit 50 inhibits the third lower arm /U2 from turning on. Thereby, it is possible to prevent a through current from flowing through the third arm circuit 307 vertically due to the third lower arm /U2 being turned on. In the same way, in some embodiments when a short-circuit failure of the fourth upper arm V2 is detected, the control circuit 50 inhibits the fourth lower arm /V2 from turning on. Thereby, it is possible to prevent a through current from flowing through the fourth arm circuit 311 vertically due to the fourth lower arm /V2 being turned on.

It is also possible that the control circuit 50, for example, inhibits the first upper arm U1 and the first lower arm /U1 from turning on, when a failed arm having a short-circuit failure is the third upper arm U2. This is because when the third upper arm U2 has a short-circuit failure, the phase difference φu between timing of turning on the third upper arm U2 and timing of turning on the first upper arm U1 cannot be generated. As a result of the first upper arm U1 and the first lower arm /U1 being thus inhibited from turning on, it is possible to reduce the power consumption in the first upper arm U1 and the first lower arm /U1 otherwise being generated from being turned on, for example.

In the same way, it is also possible that the control circuit 50 inhibits the second upper arm V1 and the second lower arm /V1 from turning on, when a failed arm having a short-circuit failure is the fourth upper arm V2, for example. This is because when the fourth upper arm V2 has a short-circuit failure, the phase difference φu between timing of turning on the fourth upper arm V2 and timing of turning on the second upper arm V1 cannot be generated. As a result of the second upper arm V1 and the second lower arm /V1 being thus inhibited from turning on, it is possible to reduce the power consumption in the second upper arm V1 and the second lower arm /V1 otherwise being generated from being turned on, for example.

Figure 4:
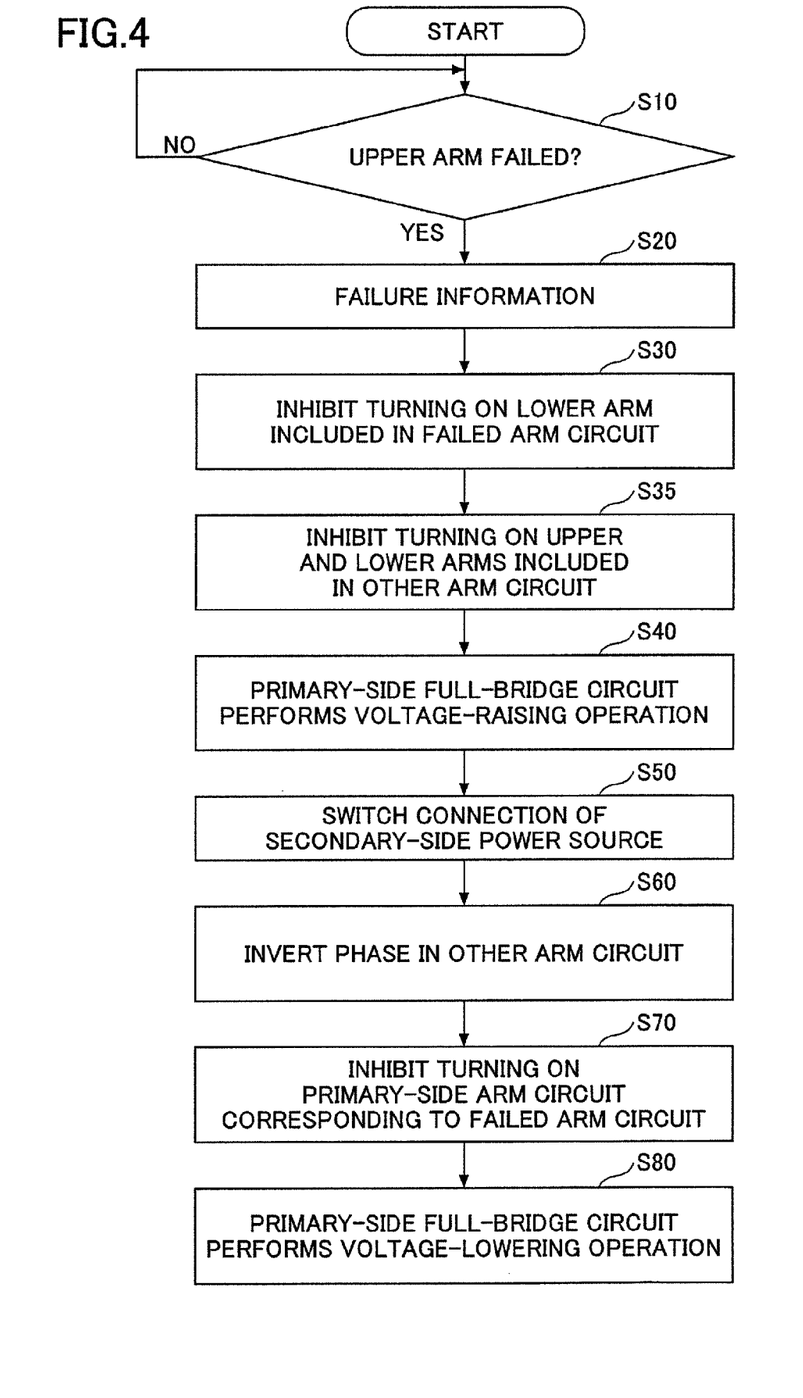
FIGS. 4 and 5 are flowcharts illustrating one example of operations of the power conversion apparatus.

FIG. 4 illustrates one example of operations of the power supply unit 101.

In step S10, the control circuit 50 determines whether one of the third upper arm U2 and the fourth upper arm V2 has a short-circuit failure.

If one of the third upper arm U2 and the fourth upper arm V2 is determined to have a short-circuit failure in step S10, the control circuit 50 sends a signal indicating the failure to a predetermined destination (for example, a memory, a load, or the like) in step S20. More specifically, the control circuit 50 sends a signal indicating an appearance of the failed arm having the short-circuit failure to, for example, at least one of the load 61a and 61c receiving the power from the primary-side full-bridge circuit 200 and the load 61b receiving the power from the secondary-side full-bridge circuit 300. Thereby, for example, each load thus receiving the signal can carry out operation dealing with the appearance of the failed arm.

When one of the third upper arm U2 and the fourth upper arm V2 has a short-circuit failure, it is difficult for the power supply unit 101 to supply the entirety of the necessary power for the respective loads as it has been doing. In some embodiments, the control circuit 50 controls the primary-side full-bridge circuit 200 and the secondary-side full-bridge circuit 300 in such a manner as to supply power to the respective loads according to a predetermined priority order. The control circuit 50 is allowed to stop the operation of the load having the lower priority order, and/or temporarily switch the operation mode of the load having the priority order lower than a criterion into a low power consumption mode such as a sleep mode. The control circuit 50 is allowed to separate the load having the priority order lower than a criterion from the primary-side full-bridge circuit 200 or the secondary-side full-bridge circuit 300.

In step S30, the control circuit 50 inhibits the lower arm included in the failed arm circuit (the arm circuit including the upper arm having the short-circuit failure) from turning on. Thereby, it is possible to prevent a through current from flowing through the upper and lower arms of the failed arm circuit.

In step S35, the control circuit 50 inhibits the upper and lower arms included in the other arm circuit connected parallel to the failed arm circuit from turning on. "The upper and lower arms included in the other arm circuit" mean, the fourth upper arm V2 and the fourth lower arm /V2 when the third upper arm U2 has a short-circuit failure, and mean the third upper arm U2 and the third lower arm /U2 when the fourth upper arm V2 has a short-circuit failure.

As a result of the upper and lower arms included in the other arm circuit thus being inhibited from turning on, it is possible to minimize the currents flowing through the secondary-side full-bridge circuit 300. Therefore, it is possible to suppress a surge generated when the connections of the electrodes of the secondary-side battery 62b are switched in step S50 as will be described later, for example.

In step S40, the control circuit 50 switches the operation of the primary-side full-bridge circuit 200 from the voltage-lowering operation to the voltage-raising operation so as to cause the port voltage Va to be coincident with the target voltage Vao that is set for the first port 60a. Thereby, even when the transmission power P transmitted from the secondary-side full-bridge circuit 300 to the primary-side full-bridge circuit 200 is reduced or comes to be zero due to the short-circuit failure of the third upper arm U2 or the fourth upper arm V2, it is possible to compensate for it with the power from the battery 62c to cover the power necessary for the load 61a. For example, the primary-side full-bridge circuit 200 raises the voltage of the power that is input to the center tap 202m via the terminal 616 of the second port 60c to supply the voltage-raised power to the load 61a.

Note that the respective operations in steps S20, S30, S35 and S40 can be executed simultaneously. It is also possible that the order of executing the respective steps S20, S30, S35 and S40 can be changed.

In step S50, the control circuit 50 switches the connection of the positive electrode 63 of the battery 62b to the secondary-side negative-polarity bus 399 and switches the connection of the negative electrode 64 of the battery 62b to the secondary-side positive-polarity bus 398. At this time, the control circuit 50 controls the switching circuit 313 so that after the connection of the positive electrode 63 is removed, the negative electrode 64 is connected to the secondary-side positive-polarity bus 398; and after the negative electrode 64 is connected to the secondary-side positive-polarity bus 398, the positive electrode 63 is connected to the secondary-side negative-polarity bus 399. It is also possible that the control circuit 50 controls the switching circuit 313 so that after the connection of the negative electrode 64 is removed, the positive electrode 63 is connected to the secondary-side negative-polarity bus 399; and after the positive electrode 63 is connected to the secondary-side negative-polarity bus 399, the negative electrode 64 is connected to the secondary-side positive-polarity bus 398. Thereby, it is possible to avoid short-circuiting in the battery 62b.

In step S60, the control circuit 50 inverts the phase of switching in the other arm circuit connected parallel to the failed arm circuit with respect to the phase that has been operating before the short-circuit failure of the upper arm is detected in step S10. Thereby, it is possible to replace the roles of the upper and lower arms of the other arm circuit.

In step S70, the control circuit 50 inhibits the upper and lower arms included in the primary-side arm circuit corresponding to the failed arm circuit from turning on. For example, if the failed arm having the short-circuit failure is the third upper arm U2, the control circuit 50 inhibits the first upper arm U1 and the first lower arm /U1 from turning on. If the failed arm having the short-circuit failure is the fourth upper arm V2, the control circuit 50 inhibits the second upper arm V1 and the second lower arm /V1 from turning on. Thereby, it is possible to reduce the power consumption in the primary-side full-bridge circuit 200.

In step S80, the control circuit 50 switches the operation of the primary-side full-bridge circuit 200 from the voltage-raising operation to the voltage-lowering operation so as to cause the port voltage Vc to be coincident with the target voltage Vco that is set for the second port 60c. This is because, due to steps S50 and S60, the power transmission is continued from the secondary-side full-bridge circuit 300 to the primary-side full-bridge circuit 200, and thus, it is possible to cover the power necessary for the load 61a by the transmission power P.

Figure 5:
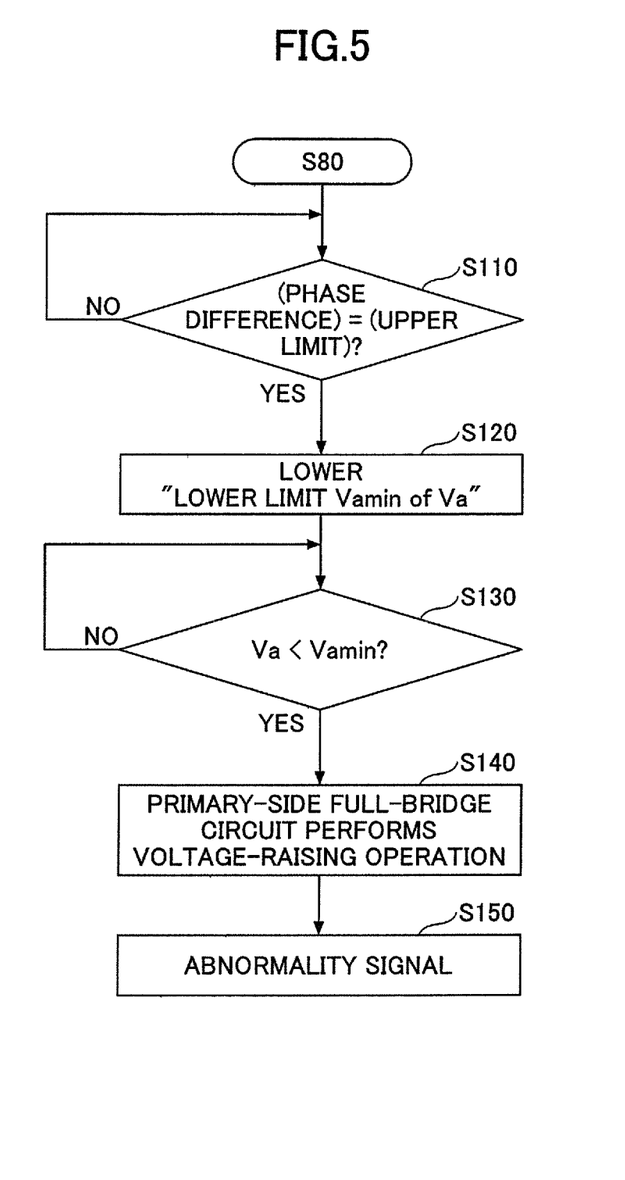

FIG. 5 shows a flowchart of operations of the power supply unit 101 after execution of step S80 of FIG. 4.

Normally, the control circuit 50 controls the duty ratio D in such a manner that the port voltage Vc will be consistent with the target voltage Vco that is set for the second port 60c, and controls the phase differences $\phi$ in such a manner that the port voltage Va will be consistent with the target voltage Vao that is set for the first port 60a. However, after the connections of the positive electrode 63 and the negative electrode 64 are thus replaced and the phase in the other arm circuit connected parallel to the failed arm circuit is thus inverted, the maximum value of the transmission power P that can be transmitted is reduced (approximately, a half the normal power). Therefore, there is a likelihood that, due to an increase in the required power of the load 61a having the relatively high priority order or so, the required power of the respective loads exceeds the maximum power that can be transmitted by the power supply circuit 10, and the absolute values of the phase differences $\phi$ reach the upper limits (guard values). On the other hand, the load 61a can absorb a certain amount of a variation in the port voltage Va. Therefore, after execution of step S80 of FIG. 4, according to the procedure shown in FIG. 5, the control circuit 50 carries out the control in such a manner as to allow a voltage drop in the port voltage Va so as to maintain the port voltage Vc in preference to the port voltage Va, and prevent the absolute values of the phase differences $\phi$ from being fixed to the upper limits.

In step S110, the control circuit 50 determines whether the phase differences $\phi$ are equal to the upper limits $\phi$max. Note that because the transmission power P that can be transmitted at a time of a short-circuit failure is approximately a half the transmission power P that can be transmitted in the normal state, the upper limits $\phi$max of the phase differences $\phi$ at the time of a short-circuit failure are "$\phi_1/2$" assuming that the upper limits $\phi$max of the phase differences $\phi$ in the normal state are $\phi_1$.

When the control circuit 50 determines that the phase differences $\phi$ are fixed at "$\phi_1/2$" in step S110, the control circuit 50 again sets the lower limit Vamin of the permissible voltage range of the port voltage Va into a value lower than the value of the normal state, in step S120. Thereby, it is possible to allow the port voltage Va at the time of a short-circuit failure to become lower than that of the normal state.

In step S130, the control circuit 50 determines whether the detection value of the port voltage Va is lower than the lower limit Vamin that is again set in step S120.

If the detection value of the port voltage Va is lower than the lower limit Vamin that is again set in step S120, it is not possible to cover the required power of the load 61a only by the transmission power P.

Therefore, in step S140, if the port voltage Va is lower than the lower limit Vamin that is again set in step S120 (YES in step S130), the control circuit 50 switches the operation of the primary-side full-bridge circuit 200 from the voltage-lowering operation to the voltage-raising operation. Thereby, it is possible to cover the required power of the load 61a not only by the transmission power P but also by the power from the battery 62c.

In step S150, the control circuit 50 sends a signal indicating the abnormality to a predetermined destination (for example, a memory, the load or so). For example, the control circuit 50 sends a signal indicating the abnormality to at least one of the loads 61a, 61b and 61c, to report that the power supply unit 101 has a more serious situation than a short-circuit failure.

Figure 6:
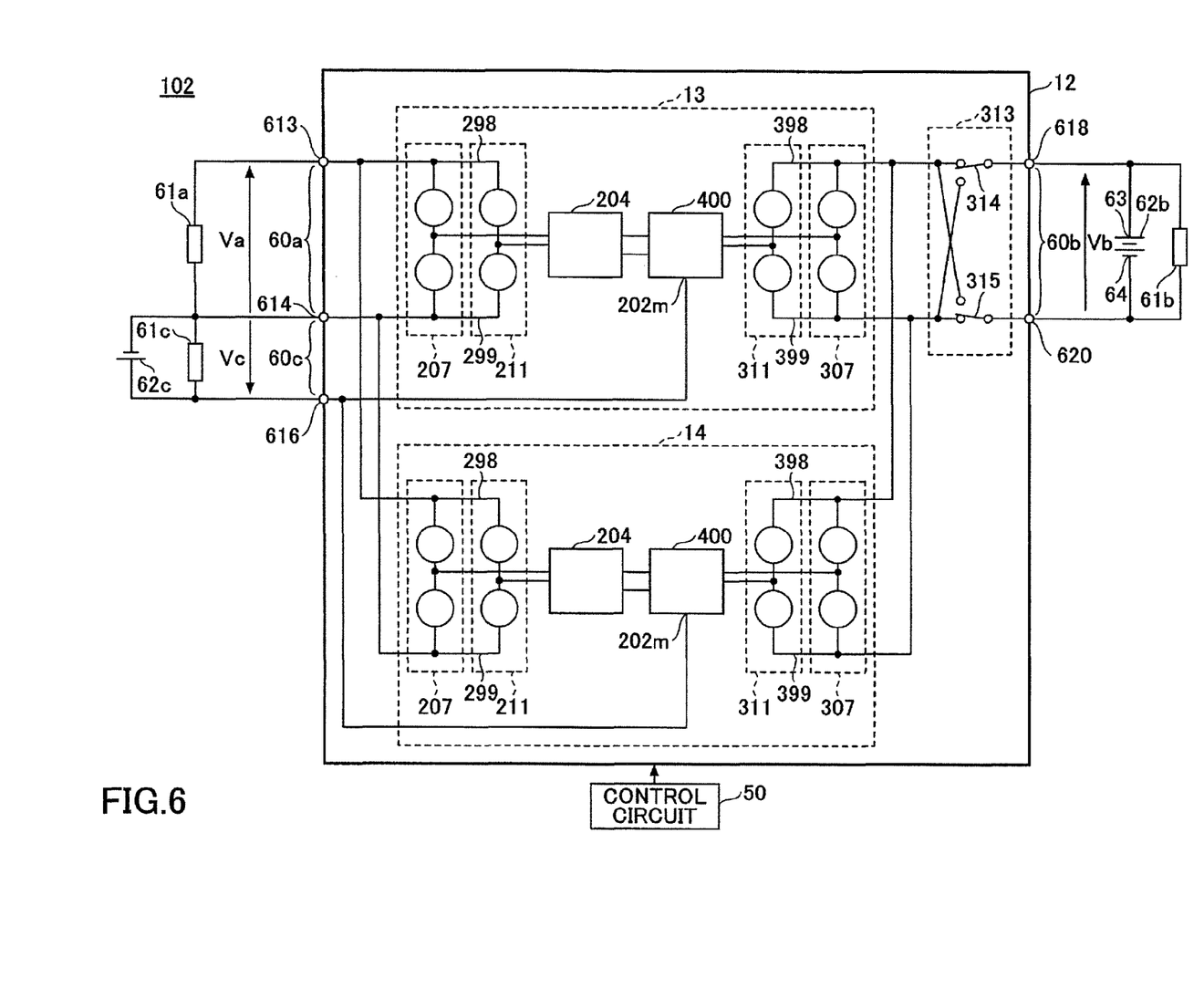
FIG. 6 illustrates another example of the power conversion apparatus.

FIG. 6 illustrates one example of a configuration of a power supply unit 102 in another embodiment of a power conversion apparatus. The description of the configurations that are the same as those in FIG. 1 will be omitted. The power supply unit 102 includes, for example, a power supply circuit 12 and a control circuit 50. The power supply circuit 12 includes a plurality of converters connected in parallel. In particular, the converter 13 and the converter 14 are connected in parallel. Each of the converter 13 and the converter 14 has the same configuration as the converter 11 of FIG. 1. The maximum power suppliable by the converter 13 can be the same as or different from the maximum power suppliable by the converter 14.

The respective primary-side positive-polarity buses 298 of the converters 13 and 14 are connected together. The respective primary-side negative-polarity buses 299 of the converters 13 and 14 are connected together. The respective center taps 202m of the converters 13 and 14 are connected together. The respective secondary-side positive-polarity buses 398 of the converters 13 and 14 are connected together. The respective secondary-side negative-polarity buses 399 of the converters 13 and 14 are connected together.

If a short-circuit failure is detected in the secondary-side upper arm in either one of the converters 13 and 14, the control circuit 50 switches the connections of the electrodes of the battery 62b by the switching circuit 313, and inverts the phase of switching in the arm circuit other than the failed arm circuit including the failed arm that is one of the third arm circuit 307 and the fourth arm circuit 311. Thereby, in the converters 13 and 14, although the maximum power suppliable by the converter having the short-circuit failure detected therein is approximately halved when the short-circuit failure is detected, it is possible to make approximately constant the maximum power suppliable by the converter other than the converter having the short-circuit failure detected therein.

The claimed subject matter is not limited to the embodiments described herein. Various modifications and improvements, such as combinations, replacements and/or the like with some or all of the other embodiment(s), can be made without departing from the claimed subject matter.

For example, the respective arms are not limited to MOSFETs, and can be semiconductor switching devices that perform turning-on/off operations. For example, the respective arms can be voltage-control-type power devices with insulated gates such as IGBTs, MOSFETs, or so, or bipolar transistors.

Also, in the above description, it is possible to define "primary or primary-side" as "secondary or secondary-side" and define "secondary or secondary-side" as "primary or primary-side".

According to some embodiments, the connections of the positive electrode and the negative electrode of the power source are replaced, and also, the phase in switching of the other arm circuit is inverted. Thus, it is possible to replace the roles of the upper arm and the lower arms included in the other arm circuit. In other words, the upper arm included in the other arm circuit plays the role of the lower arm, and the lower arm included in the other arm circuit plays the role of the upper arm. Therefore, even if one of the third upper arm and the fourth upper arm has a short-circuit failure, it is possible to apply the voltage of the power source to the secondary coil of the transformer in timing where the lower arm playing the role of the upper arm is turned on. Thus, it is possible to continue the power transmission between the primary-side full-bridge circuit and the secondary-side full-bridge circuit.

What is claimed is:

1. A power conversion apparatus comprising:
a transformer having a primary coil and a secondary coil;
a primary-side full-bridge circuit having a first arm circuit including a first upper arm and a first lower arm connected in series, and a second arm circuit including a second upper arm and a second lower arm connected in series, wherein the primary coil is included in a first bridge part that connects a first middle point between the first upper arm and the first lower arm and a second middle point between the second upper arm and the second lower arm;
a secondary-side full-bridge circuit having a third arm circuit including a third upper arm and a third lower arm connected in series, and a fourth arm circuit including a fourth upper arm and a fourth lower arm connected in series, wherein the secondary coil is included in a second bridge part that connects a third middle point between the third upper arm and the third lower arm and a fourth middle point between the fourth upper arm and the fourth lower arm; and
a control part that adjusts a first phase difference between switching in the first arm circuit and switching in the third arm circuit and a second phase difference between switching in the second arm circuit and switching in the fourth arm circuit, and controls transmission power transmitted between the primary-side full-bridge circuit and the secondary-side full-bridge circuit, wherein
when a short-circuit failure is detected in one of the third upper arm and the fourth upper arm, the control part switches a connection of a positive electrode of a power source to a negative-polarity bus of the secondary-side full-bridge circuit, switches a connection of a negative electrode of the power source to a positive-polarity bus of the secondary-side full-bridge circuit, and inverts a phase of switching in one of the third arm circuit and the fourth arm circuit other than the one having the short-circuit failure.

2. The power conversion apparatus as claimed in claim 1, wherein
the control part inhibits one of the third lower arm and the fourth lower arm included in the arm circuit having the short-circuit failure from being turned on.

3. The power conversion apparatus as claimed in claim 2, wherein
the control part inhibits an upper arm and a lower arm included in the one of the third arm circuit and the fourth arm circuit other than the one having the short-circuit failure from being turned on before switching the connection of the positive electrode of the power source to the negative-polarity bus of the secondary-side full-bridge circuit and switching the connection of the negative electrode of the power source to the positive-polarity bus of the secondary-side full-bridge circuit.

4. The power conversion apparatus as claimed in claim 2, wherein
the control part inhibits the first upper arm and the first lower arm from being turned on when the third upper arm has the short-circuit failure, and inhibits the second upper arm and the second lower arm from being turned on when the fourth upper arm has the short-circuit failure.

5. The power conversion apparatus as claimed in claim 4, wherein
the control part inhibits an upper arm and a lower arm included in the one of the third arm circuit and the fourth arm circuit other than the one having the short-circuit failure from being turned on before switching the connection of the positive electrode of the power source to the negative-polarity bus of the secondary-side full-bridge circuit and switching the connection of the negative electrode of the power source to the positive-polarity bus of the secondary-side full-bridge circuit.

6. The power conversion apparatus as claimed in claim 1, wherein
the first bridge part in the primary-side full-bridge circuit further includes magnetic-coupling reactors including two reactors magnetically coupled to one another and connected to both ends of the primary coil, and
when the short-circuit failure is detected, the primary-side full-bridge circuit raises a voltage of power that is input to a center tap of the primary coil, and supplies the voltage-raised power to a load.

7. The power conversion apparatus as claimed in claim 6, wherein
the control part switches an operation of the primary-side full-bridge circuit from a voltage-raising operation to a voltage-lowering operation in order that the primary-side full-bridge circuit lowers the voltage of power that is input to the center tap of the primary coil, and supplies the voltage-lowered power to the load.

8. The power conversion apparatus as claimed in claim 1, wherein
the control part sends a signal indicating the short-circuit failure to at least one of a first load receiving power from the primary-side full-bridge circuit and a second load receiving power from the secondary-side full-bridge circuit.

9. A power conversion apparatus comprising:
a plurality of converters each including:
   a transformer having a primary coil and a secondary coil;
   a primary-side full-bridge circuit having a first arm circuit including a first upper arm and a first lower arm connected in series, and a second arm circuit including a second upper arm and a second lower arm connected in series, wherein the primary coil is included in a first bridge part that connects a first middle point between the first upper arm and the first lower arm and a second middle point between the second upper arm and the second lower arm;
   a secondary-side full-bridge circuit having a third arm circuit including a third upper arm and a third lower arm connected in series, and a fourth arm circuit including a fourth upper arm and a fourth lower arm connected in series, wherein the secondary coil is included in a second bridge part that connects a third middle point between the third upper arm and the third lower arm and a fourth middle point between the fourth upper arm and the fourth lower arm; and
   a control part that adjusts a first phase difference between switching in the first arm circuit and switching in the third arm circuit and a second phase difference between switching in the second arm circuit and switching in the fourth arm circuit, and controls transmission power transmitted between the primary-side full-bridge circuit and the secondary-side full-bridge circuit, wherein
   when a short-circuit failure is detected in one of the third upper arm and the fourth upper arm, the control part switches a connection of a positive electrode of a power source to a negative-polarity bus of the secondary-side full-bridge circuit, switches a connection of a negative electrode of the power source to a positive-polarity bus of the secondary-side full-bridge circuit, and inverts a phase of switching in one of the third arm circuit and the fourth arm circuit other than the one having the short-circuit failure, wherein
   respective positive-polarity buses of the primary-side full-bridge circuits in the plurality of converters are connected together,
   respective negative-polarity buses of the primary-side full-bridge circuits in the plurality of converters are connected together,
   the respective positive-polarity buses of the secondary-side full-bridge circuits in the plurality of converters are connected together, and
   the respective negative-polarity buses of the secondary-side full-bridge circuits in the plurality of converters are connected together.

10. The power conversion apparatus as claimed in claim 9, wherein
   in each of the plurality of converters, the control part inhibits one of the third lower arm and the fourth lower arm included in the arm circuit having the short-circuit failure from being turned on.

11. The power conversion apparatus as claimed in claim 10, wherein
   in each of the plurality of converters, the control part inhibits an upper arm and a lower arm included in the one of the third arm circuit and the fourth arm circuit other than the one having the short-circuit failure from being turned on before switching the connection of the positive electrode of the power source to the negative-polarity bus of the secondary-side full-bridge circuit and switching the connection of the negative electrode of the power source to the positive-polarity bus of the secondary-side full-bridge circuit.

12. The power conversion apparatus as claimed in claim 10, wherein
   in each of the plurality of converters, the control part inhibits the first upper arm and the first lower arm from being turned on when the third upper arm has the short-circuit failure, and inhibits the second upper arm and the second lower arm from being turned on when the fourth upper arm has the short-circuit failure.

13. The power conversion apparatus as claimed in claim 12, wherein
   in each of the plurality of converters, the control part inhibits an upper arm and a lower arm included in the one of the third arm circuit and the fourth arm circuit other than the one having the short-circuit failure from being turned on before switching the connection of the positive electrode of the power source to the negative-polarity bus of the secondary-side full-bridge circuit and switching the connection of the negative electrode of the power source to the positive-polarity bus of the secondary-side full-bridge circuit.

14. The power conversion apparatus as claimed in claim 9, wherein
   in each of the plurality of converters,
      the first bridge part in the primary-side full-bridge circuit further includes magnetic-coupling reactors including two reactors magnetically coupled to one another and connected to both ends of the primary coil, and
      when the short-circuit failure is detected, the primary-side full-bridge circuit raises a voltage of power that is input to a center tap of the primary coil, and supplies the voltage-raised power to a load.

15. The power conversion apparatus as claimed in claim 14, wherein
   in each of the plurality of converters, the control part switches an operation of the primary-side full-bridge circuit from a voltage-raising operation to a voltage-lowering operation in order that the primary-side full-bridge circuit lowers the voltage power that is input to the center tap of the primary coil, and supplies the voltage-lowered power to the load.

16. The power conversion apparatus as claimed in claim 9, wherein
   in each of the plurality of converters, the control part sends a signal indicating the short-circuit failure to at least one of a first load receiving power from the primary-side full-bridge circuit and a second load receiving power from the secondary-side full-bridge circuit.

* * * * *